United States Patent
Delta et al.

(10) Patent No.: US 7,660,759 B2
(45) Date of Patent: Feb. 9, 2010

(54) EXTENDED HOURS TRADE FILTERING

(75) Inventors: John Delta, Vienna, VA (US); Donald Bosic, Germantown, MD (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 2027 days.

(21) Appl. No.: 09/841,661

(22) Filed: Apr. 24, 2001

(65) Prior Publication Data

US 2002/0156717 A1  Oct. 24, 2002

(51) Int. Cl.
    G06Q 40/00 (2006.01)
(52) U.S. Cl. .................................................. 705/37
(58) Field of Classification Search ............... 705/35, 705/36, 37, 36 R
    See application file for complete search history.

(56) References Cited

U.S. PATENT DOCUMENTS

| | | | | |
|---|---|---|---|---|
| 5,596,493 | A * | 1/1997 | Tone et al. | 705/10 |
| 5,895,453 | A * | 4/1999 | Cook | 705/22 |
| 6,360,211 | B1 * | 3/2002 | Anderson et al. | 705/40 |
| 6,944,599 | B1 * | 9/2005 | Vogel et al. | 705/37 |
| 2001/0042033 | A1 * | 11/2001 | Sposito | 705/35 |
| 2002/0029180 | A1 * | 3/2002 | Kirwin et al. | 705/37 |

OTHER PUBLICATIONS

Anonymous, "Japan", Euromoney, London, May 1993, p. 78.*

"Chicago Board of Trade Reverses Course, Supports CFTC", Treasury Manager's Report, Potomac: Feb. 3, 1995, p. 1.*

"Special Study: ECNs and After-hours Trading" retrieved from the U.S. Securities and Exchange Commission website <URL: http://www.sec.gov/news/studies/ecnafter.htm> on Jul. 22, 2007, document was published in Jun. 2000.

Nasdaq's website on "Index Descriptions" retrieved from http://quotes.nasdaq.com/references/indexDescriptions.stm> on Jul. 22, 2007.

Nasdaq's website on "Nasdaq-100 After Hours IndicatorSM" retrieved from <URL: http://dynamic.nasdaq.com/dynamic/nasdaq100_indicator_after.stm> on Jul. 22, 2007.

Hansard et al., "This Dinner Theater Features Tragedies," Investment News, vol. 5, No. 13, p. 2, Apr. 2, 2001.

Office Action and Reply filed in U.S. Appl. No. 09/941,491.

* cited by examiner

*Primary Examiner*—Alexander Kalinowski
*Assistant Examiner*—Olabode Akintola
(74) *Attorney, Agent, or Firm*—Fish & Richardson P.C.

(57) ABSTRACT

A trade filtering process for preventing the processing of suspect trades includes a trade monitoring process for monitoring a trade price associated with each trade of a specific stock during a trading session. A trade comparison process, responsive to the trade monitoring process, compares the trade price of each trade of a specific stock to a known acceptable price for that specific stock to determine which trades are suspect trades. A suspect trade filtering process, responsive to the trade comparison process, prevents the processing of the suspect trades.

35 Claims, 4 Drawing Sheets

US 7,660,759 B2

EXTENDED HOURS TRADE FILTERING

TECHNICAL FIELD

This invention relates to trade filtering, and more particularly to extended hours trade filtering.

BACKGROUND

Stock markets that trade elec0tronically (e.g., The Nasdaq Stock Market™), as opposed to those that trade on a trading floor (e.g., the New York Stock Exchange™), can conduct trading for extended periods of time.

As traditional, floor-traded, stock markets require interaction on a trading floor between human traders to accomplish stock trades, this trading most typically occurs during normal trading hours. However, electronically traded stock markets allow for automated trading between traders via computers before and after normal trading hours.

SUMMARY

According to an aspect of this invention, a trade filtering process for preventing the processing of suspect trades includes a trade monitoring process for monitoring a trade price associated with each trade of a specific stock during a trading session. A trade comparison process, responsive to the trade monitoring process, compares the trade price of each trade of a specific stock to a known acceptable price for that specific stock to determine which trades are suspect trades. A trade filtering process, responsive to the trade comparison process, prevents the processing of the suspect trades.

One or more of the following features may also be included. The trade filtering process further includes an acceptable price determination process for determining the value of the known acceptable price. The acceptable price determination process includes a known price determination process for determining the last known good price for a specific stock being traded. A price acceptability window process determines the known acceptable price, wherein the known acceptable price is an acceptable range of prices which span from a specific amount below the last known good price to a specific amount above the last known good price, wherein the trades which have trade prices that do not fall within the acceptable range of prices are considered suspect trades. A last known good price adjustment process adjusts the last known good price of the specific stock being traded to be equal to the trade price of the last non-suspect trade. The specific amount above the last known good price and the specific amount below the last known good price are fixed dollar amounts. The specific amount above the last known good price and the specific amount below the last known good price are a percentage of the last known good price. The percentage of the last known good price is 15%. The trade filtering process further includes a last known good price initiation process for adjusting the last known good price of the specific stock being traded to be equal to a reference value whenever the stock is being traded for the first time in the trading session. The reference value is the trade price of the specific stock being traded. The reference value is a previous day's closing price.

One or more of the following features may also be included. The trade filtering process further includes a suspect trade resolution process for determining if each suspect trade is a bad trade. The suspect trade resolution process includes a suspect trade repository process for storing the trade price of the suspect trade. A non-suspect price determination process determines the trade price of at least a first non-suspect trade of the specific stock to occur after the suspect trade. A suspect trade acceptability window process determines a suspect acceptability price range, wherein the suspect acceptability price range spans from a specific amount below the trade price of the suspect trade to a specific amount above the trade price of the suspect trade, wherein the suspect trade is considered a non-suspect trade if the trade price of the at least a first non-suspect trade falls within the suspect acceptability price range. A last known good price adjustment process adjusts the last known good price of the specific stock being traded to be equal to the trade price of the last non-suspect trade. The at least a first non-suspect trade is one trade. The at least a first non-suspect trade is three consecutive trades. The specific amount above the trade price of the suspect trade and the specific amount below the trade price of the suspect trade are fixed dollar amounts. The specific amount above the trade price of the suspect trade and the specific amount below the trade price of the suspect trade are a percentage of the trade price of the suspect trade. The percentage of the trade price of the suspect trade is 5%. The trade monitoring process monitors a trade volume associated with each trade. The trade filtering process further includes a validity filter process for examining the trade volume and the trade price of each trade. The validity filter process discards trades whose trade volume is negative, whose trade volume is zero, whose trade price is negative, and whose trade price is zero.

According to an aspect of this invention, a trade filtering process for preventing the processing of suspect trades includes a trade monitoring process for monitoring a trade price associated with each trade of a specific stock during a trading session. A trade comparison process, responsive to the trade monitoring process, compares the trade price of each trade of a specific stock to a known acceptable price for that specific stock to determine which trades are suspect trades. A trade filtering process, responsive to the trade comparison process, prevents the processing of the suspect trades. A known price determination process determines a last known good price for a specific stock being traded. A price acceptability window process determines the known acceptable price, wherein the known acceptable price is an acceptable range of prices which span from a specific amount below the last known good price to a specific amount above the last known good price, wherein the trades which have trade prices that do not fall within the acceptable range of prices are considered suspect trades. A last known good price adjustment process adjusts the last known good price of the specific stock being traded to be equal to the trade price of the last non-suspect trade.

One or more of the following features may also be included. The trade filtering process further includes a suspect trade resolution process for determining if each the suspect trades is a bad trade. The suspect trade resolution process includes a suspect trade repository process for storing the trade price of the suspect trade. A non-suspect price determination process determines the trade price of at least a first non-suspect trade of the specific stock to occur after the suspect trade. A suspect trade acceptability window process determines a suspect acceptability price range, wherein the suspect acceptability price range spans from a specific amount below the trade price of the suspect trade to a specific amount above the trade price of the suspect trade, wherein the suspect trade is considered a non-suspect trade if the trade price of the at least a first non-suspect trade falls within the suspect acceptability price range. A last known good price adjustment process adjusts the last known good price of the specific stock being traded to be equal to the trade price of the last non-suspect trade.

According to an aspect of this invention, a trade filtering method for preventing the processing of suspect trades includes: monitoring a trade price associated with each trade of a specific stock during a trading session; comparing the trade price of each trade of a specific stock to a known acceptable price for that specific stock to determine which trades are suspect trades; and preventing the processing of the suspect trades.

One or more of the following features may also be included. The trade filtering method further includes determining the value of the known acceptable price. Determining the value of the known acceptable price includes: determining a last known good price for the specific stock being traded; determining the known acceptable price, wherein the known acceptable price is an acceptable range of prices which span from a specific amount below the last known good price to a specific amount above the last known good price, wherein the trades which have trade prices that do not fall within the acceptable range of prices are considered suspect trades; and adjusting the last known good price of the specific stock being traded to be equal to the trade price of the last non-suspect trade. The trade filtering method further includes adjusting the last known good price of the specific stock being traded to be equal to a reference value whenever the stock is being traded for the first time in the trading session. The trade filtering method further includes determining if each suspect trade is a bad trade. Determining if each suspect trade is a bad trade includes: storing the trade price of the suspect trade; determining the trade price of at least a first non-suspect trade of the specific stock to occur after the suspect trade; determining a suspect acceptability price range, wherein the suspect acceptability price range spans from a specific amount below the trade price of the suspect trade to a specific amount above the trade price of the suspect trade, wherein the suspect trade is considered a non-suspect trade if the trade price of the at least a first non-suspect trade falls within the suspect acceptability price range; and adjusting the last known good price of the specific stock being traded to be equal to the trade price of the last non-suspect trade. The trade filtering method further includes: monitoring a trade volume associated with each trade; examining the trade volume and trade price of each trade; and discarding trades whose trade volume is negative, whose trade volume is zero, whose trade price is negative, and whose trade price is zero.

According to an aspect of this invention, a computer program product residing on a computer readable medium has a plurality of instructions stored thereon which, when executed by the processor, cause that processor to: monitor a trade price associated with each trade of a specific stock during a trading session; compare the trade price of each trade of a specific stock to a known acceptable price for that specific stock to determine which trades are suspect trades; and prevent the processing of the suspect trades.

One or more of the following features may also be included. The computer readable medium is a hard drive, a read-only memory, or a random-access memory.

According to an aspect of this invention, a processor and memory is configured to: monitor a trade price associated with each trade of a specific stock during a trading session; compare the trade price of each trade of a specific stock to a known acceptable price for that specific stock to determine which trades are suspect trades; and prevent the processing of the suspect trades.

One or more of the following features may also be included. The processor and memory are incorporated into a personal computer, a single board computer, or an array of network servers.

One or more advantages can be provided from the above. All trades are scrutinized and compared to administrator-defined parameters to verify their authenticity and accuracy. Questionable or suspect trades are further scrutinized and compared to additional administrator-defined parameters to determine if these trades are valid. Any invalid trade will not be processed or posted to the trading system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
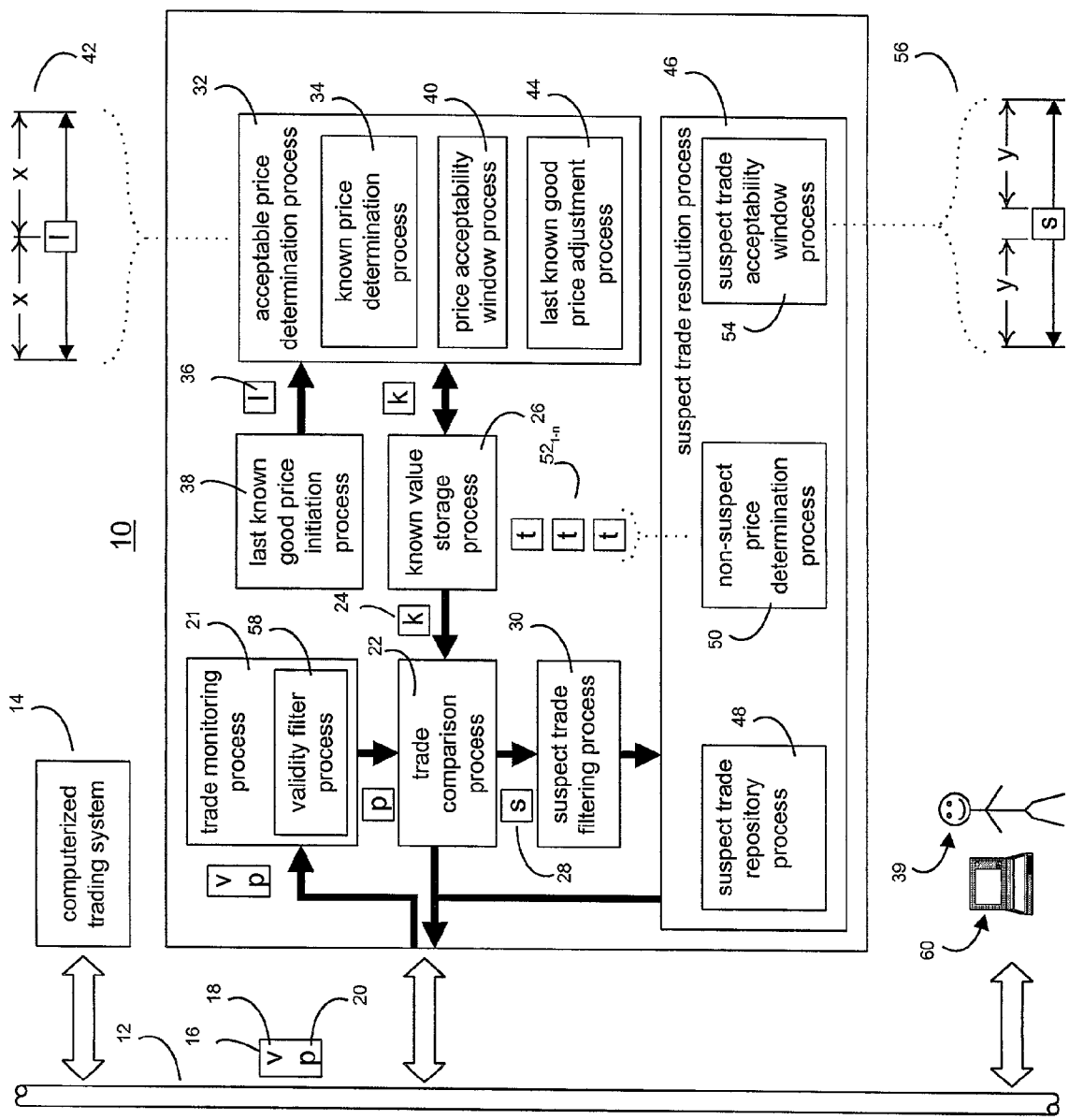
FIG. 1 is a diagrammatic view of a trade verification process.

Referring to FIG. 1, there is shown a trade filtering process 10. Trade filtering process 10 is connected to a distributed computing network 12 (e.g., the Internet, an intranet, a local area network, or some other form of network) that allows trade filtering process 10 to have access to computerized trading system 14, which trades securities electronically. When trades are processed, each trade 16 includes a trade volume "V" 18 and trade price "P" 20. Trade filtering process 10 includes a trade monitoring process 21, which monitors the trade volume 18 and trade price 20 of each trade 16 of a specific stock traded during a trading session. Trading filter process 10 monitors trades 16 that occur during extended hours trading on computerized trading systems 14. Extended hours trading is trading that occurs outside of standard market hours, such as after hours trading and pre-market trading.

A trade comparison process 22 is responsive to trade monitoring process 21. As trade monitoring process 21 monitors the trade price 20 associated with each trade for a specific stock, this trade price 20 is provided to trade comparison process 22 so that a comparison can be made. Trade comparison process 22 compares the trade price 20 of trade 16 to a known acceptable price "K" 24 for that specific stock. This comparison can identify trades that are suspect trades.

Whenever trade comparison process 22 determines a trade is a suspect trade ("S") 28, suspect trade 28 is provided to suspect trade filtering process 30 for processing. Alternatively, any trade which trade comparison process 22 determines to be a non-suspect trade is provided to computerized trading system 14 for processing and posting.

Suspect trade filtering process 30, which is responsive to trade comparison process 22, prevents (until further analysis can be performed) the processing of those trades which trade comparison process 22 determined were suspect trades. While such suspect trades 28 are not immediately considered bad (or invalid) trades, further processing must be performed before it can be determined if these trades should be processed and posted by computerized trading system 14.

Trade filtering process 10 includes an acceptable price determination process 32 for determining the value of a known acceptable price 24. Acceptable price determination process 32 includes a known price determination process 34 for determining the last known good price ("L") 36 for the specific stock being traded. Accordingly, if the stock has already been traded in the current trading session, the last known acceptable price 36 is the price that the stock last traded at. However, if the specific stock is being traded for the first time in the current trading session, a last known good price initiation process 38 adjusts (i.e., set) the value of last known good price 36 to be equal to an administrator-definable reference value, such as: the trade price that the specific stock closed at the day before; or the trade price that the specific stock first traded at in the current trading session.

Acceptable price determination process 32 includes a price acceptability window process 40 for determining the known acceptable price 24, where the known acceptable price 24 is actually an acceptable range of prices 42 that span from a specific amount ("x") below last known good price 36 to a specific amount ("x") above last known good price 36. In the event that trade 16 has a trade value 18 that does not fall within acceptable range of prices 42, trade comparison process 22 considers trade 16 to be a suspect trade 28. This determined suspect trade 28 is provided to suspect trade filtering process 30 for further processing. The specific amount ("x") that acceptable range of prices 42 spans above and below last known good price 36 can be various values, such as: a fixed dollar amount; or a percentage (e.g., 15%) of the last known good price 36.

Acceptable price determination process 32 includes a last known good price adjustment process 44 which adjusts the value of last known good price 36 for the specific stock being traded to be equal to the trade price of the last non-suspect trade. As stated above, if the stock has already been traded in the current trading session, the last known good price 36 is the value that the stock last traded at. Therefore, if the stock has already been traded in the current trading session, last known good price 36 will be stored on known value storage process 26. Alternatively, if the stock has never been traded before in the current trading session, as stated above, last known good price initiation process 38 would determine the value of last known good price 36. Accordingly, last known good price adjustment process 44 will update the value of last known good price 36 stored on known value storage process 26 to be equal to the trade price of the last non-suspect trade.

Trade filtering process 10 includes a suspect trade resolution process 46 for determining if each suspect trade 28 is actually a bad trade and, therefore, should be discarded. Suspect trade resolution process 46 includes a suspect trade repository process 48 for storing each suspect trade 28. Suspect trade resolution process 46 determines whether suspect trade 28 is either a non-suspect trade or actually a bad trade. A non-suspect price determination process 50 monitors and examines subsequent non-suspect trades (i.e., those which occur after suspect trade 28) of the same stock as suspect trade 28 to determine the trade price $52_{1-N}$ of these subsequent non-suspect trades. Depending on the level of resolution desired, the number of non-suspect trades that are examined can be varied. For example, if only a low level of resolution is desired, one non-suspect trade of the specific stock can be examined. Alternatively, if a higher level of resolution is desired, multiple non-suspect trades can be examined.

A suspect trade acceptability window process 54 determines a suspect acceptability price range 56 which spans from a specific amount ("y") below the trade price of suspect trade 28 to a specific amount ("y") above the trade price of suspect trade 28. If the trade price(s) $52_{1-N}$ of the subsequent non-suspect trade(s) fall within suspect acceptable price range 56, suspect trade 28 will be considered a non-suspect trade. Administrator 39 of trade filtering process 10 can tune process 10 in accordance with specific needs. For example, as stated above, the number of subsequent non-suspect trades can be adjusted in accordance with the level of resolution desired. Additionally, provided that multiple subsequent non-suspect trades are examined, administrator 39 can require that the trade price $52_{1-N}$ of every subsequent non-suspect trade fall within suspect acceptable price range 56 in order for the determined suspect trade 28 to be reclassified as a non-suspect trade. Alternatively, administrator 39 can configure trade filtering process 10 so that an administrator-defined ratio of trade prices $52_{1-N}$ falling within suspect acceptable price range 56 would determine suspect trade 28 to be non-suspect.

The specific amount ("y") that suspect acceptable price range 56 spans above and below the trade price of suspect trade 28 can be various values, such as: a fixed dollar amount; or a percentage (typically 5%) of the trade price of suspect trade 28.

As stated above, trade monitoring process 21 monitors the trade volume 18 associated with each trade 16. Trade monitoring process 20 includes a validity filter process 58 that examines the trade volume 18 and trade price 20 associated with each trade 16 and discards those trades which: have a trade volume of zero; have a negative trade volume; have a trade price of zero; or have a negative trade price.

Terminal 60, such as a personal computer or workstation, is attached to network 12 and allows administrator 39 to set the adjustable parameters (e.g., process resolution, consecutiveness of non-suspect specimens, the specific amount above and below the trade price of the suspect trade; the specific amount above and below the last known good price; etc.) of trade filtering process 10.

Figure 2:
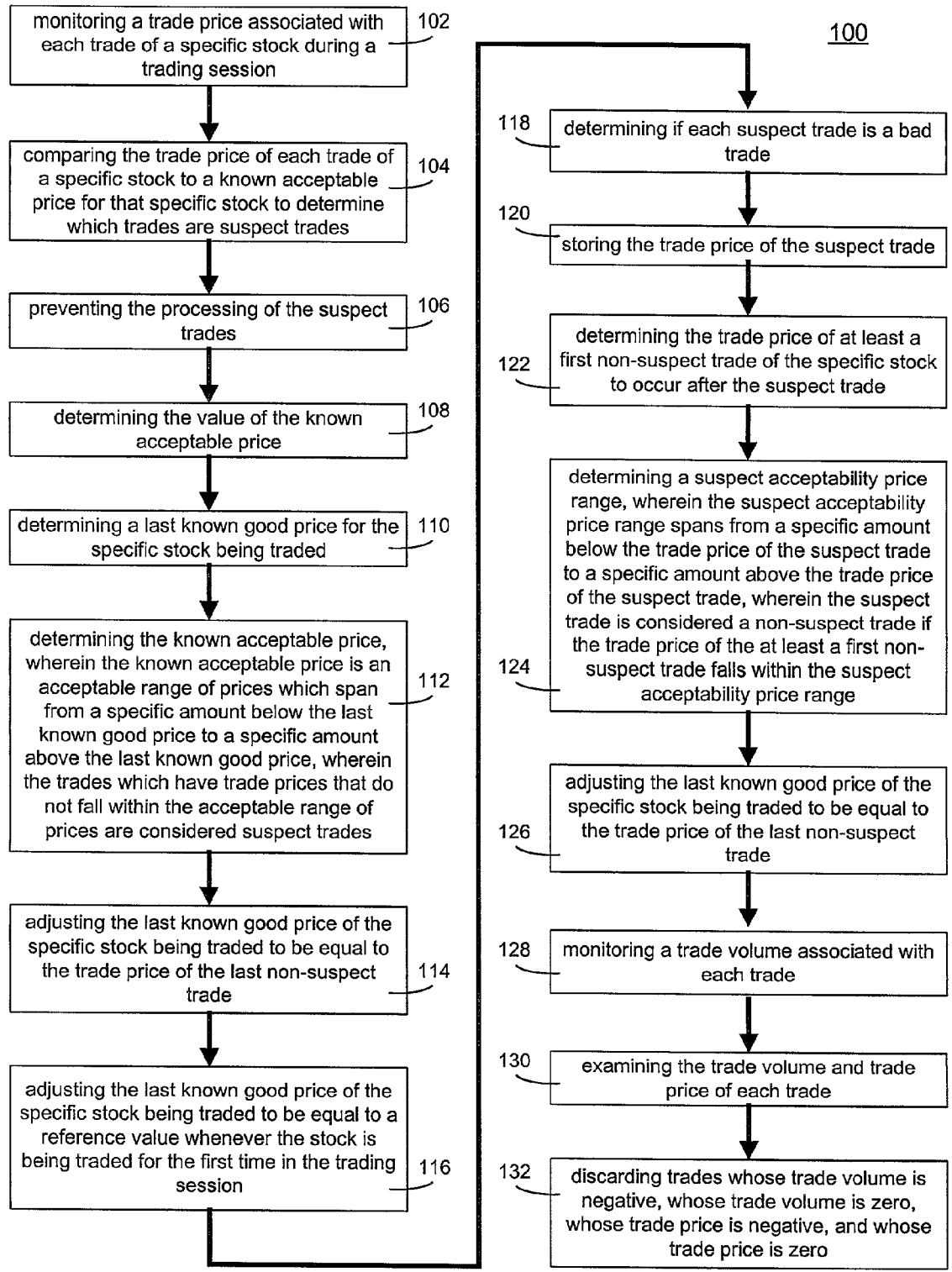
FIG. 2 is a diagrammatic view of a trade verification method.

Referring to FIG. 2, a trade filtering method 100 for preventing the processing of suspect trades includes a trade monitoring process that monitors 102 a trade price associated with each trade of a specific stock during a trading session (e.g., an after normal hours trading session). A trade comparison process compares 104 the trade price of each trade of a specific stock to a known acceptable price for that specific stock to determine which trades are suspect trades. A suspect trade filtering process prevents 106 the processing of the suspect trades. An acceptable price determination process determines 108 the value of the known acceptable price. A known price determination process determines 110 a last known good price for the specific stock being traded. A price acceptability window process determines 112 the known acceptable price. The known acceptable price can be an acceptable range of prices that span from a specific amount below the last known good price to a specific amount above the last known good price. Trades that have trade prices that do not fall within the acceptable range of prices are considered suspect trades.

A last known good price adjustment process adjusts 114 the last known good price of the specific stock being traded to be equal to the trade price of the last non-suspect trade. A last known good price initiation process adjusts 116 the last known good price of the specific stock being traded to be equal to a reference value whenever the stock is being traded for the first time in the trading session. A suspect trade resolution process determines 118 if each suspect trade is a bad trade. A suspect trade repository process stores 120 the trade price of the suspect trade. A non-suspect price determination process determines 122 the trade price of at least a first non-suspect trade of the specific stock to occur after the suspect trade. A suspect trade acceptability window process determines 124 a suspect acceptability price range that spans from a specific amount below the trade price of the suspect trade to a specific amount above the trade price of the suspect trade. The suspect trade is considered a non-suspect trade if the trade price of the at least a first non-suspect trade falls within the suspect acceptability price range. A last known good price adjustment process adjusts 126 the last known good price of the specific stock being traded to be equal to the trade price of the last non-suspect trade. A trade monitoring process monitors 128 a trade volume associated with each trade. A validity filter process examines 130 the trade volume and trade price of each trade and discards 132 trades whose trade volume is negative, whose trade volume is zero, whose trade price is negative, and/or whose trade price is zero.

Figure 3:
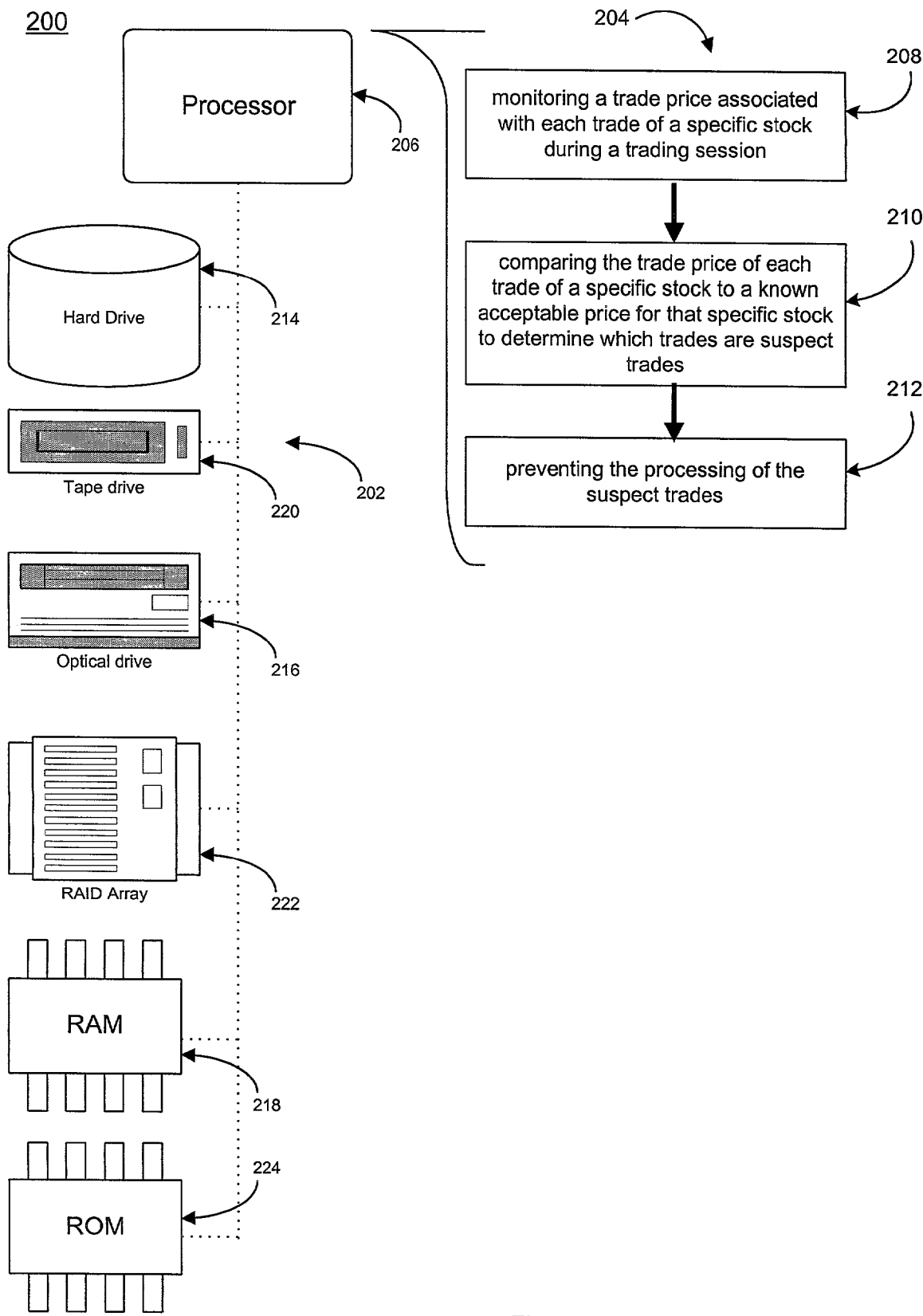
FIG. 3 is a diagrammatic view of another embodiment of the trade verification process.

Referring to FIG. 3, a computer program product 200 resides on a computer readable medium 202 having a plurality of instructions 204 stored thereon which, when executed by processor 206, cause that processor 206 to monitor 208 a trade price associated with each trade of a specific stock during a trading session. Processor 206 compares 210 the trade price of each trade of a specific stock to a known acceptable price for that specific stock to determine which trades are suspect trades. Processor 206 prevents 212 the processing of the suspect trades.

Typical embodiments of computer readable medium 202 are: hard drive 214; optical drive 216; random access memory 218; tape drive 220; RAID array 222; and read only memory 224.

Figure 4:
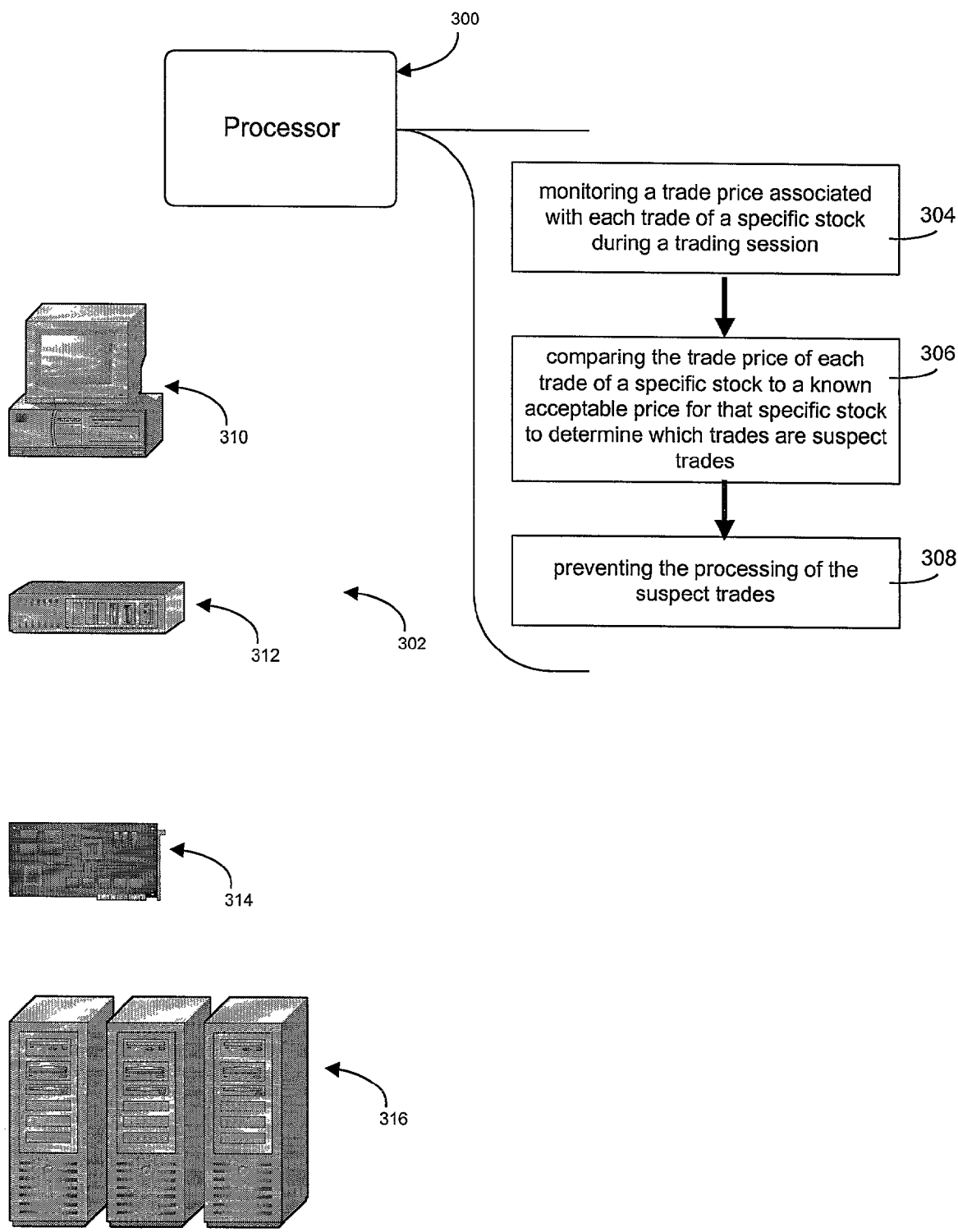
FIG. 4 is a diagrammatic view of another embodiment of the trade verification process.

Referring to FIG. 4, there is shown a processor 300 and memory 302 configured to: monitor 304 a trade price associated with each trade of a specific stock during a trading session; compare 306 the trade price of each trade of a specific stock to a known acceptable price for that specific stock to determine which trades are suspect trades; and prevent 308 the processing of the suspect trades.

Typical embodiments of processor 300 and memory 302 are personal computer 310, programmable logic controller 312, single board computer 314, and an array of network servers 316, Other embodiments are within the scope of the appended claims.

What is claimed is:

1. A computer system executing a trade filtering process for identifying suspect trades, the computer system executing processes comprising:
    a trade monitoring process for monitoring a trade price associated with each trade of a specific stock during a trading session;
    a trade comparison process, responsive to the trade monitoring process, for comparing the trade price of each trade of a specific stock to a known acceptable price for that specific stock to identify which trades are suspect trades; and
    a suspect trade filtering process, responsive to the trade comparison process, for preventing the processing of suspect trades.

2. The computer system of claim 1 further comprising an acceptable price determination process for determining the value of the known acceptable price.

3. The computer system of claim 2 wherein the acceptable price determination process includes:
    a known price determination process for determining a last known good price for the specific stock being traded.

4. The computer system of claim 3 wherein the acceptable price determination process includes:
    a price acceptability window process for determining the known acceptable price, wherein the known acceptable price is an acceptable range of prices that span from a specific amount below the last known good price to a specific amount above the last known good price, with trades that have trade prices that do not fall within the acceptable range of prices being considered suspect trades.

5. The computer system of claim 4 wherein said acceptable price determination process includes:
    a last known good price adjustment process for adjusting the last known good price of the specific stock being traded to be equal to the trade price of the last non-suspect trade.

6. The computer system of claim 4 wherein the specific amount above the last known good price and the specific amount below the last known good price are fixed dollar amounts.

7. The computer system of claim 4 wherein the specific amount above the last known good price and the specific amount below the last known good price are a percentage of the trade price associated with each trade.

8. The computer system of claim 7 wherein the percentage of said last known good price is 15%.

9. The computer system of claim 3 further comprising a last known good price initiation process for adjusting the last known good price of the specific stock being traded to be equal to a reference value whenever the stock is being traded for the first time in the trading session.

10. The computer system of claim 9 wherein the reference value is the trade price of the specific stock being traded.

11. The computer system of claim 9 wherein the reference value is a previous day's closing price.

12. The computer system of claim 3 further comprising a suspect trade resolution process for determining if each suspect trade is a bad trade.

13. The computer system of claim 12 wherein the suspect trade resolution process includes:
    a suspect trade repository process for storing the trade price of said suspect trade;
    a non-suspect price determination process for determining the trade price of at least a first non-suspect trade of the specific stock to occur after the suspect trade;
    a suspect trade acceptability window process for determining a suspect acceptability price range, wherein the suspect acceptability price range spans from a specific amount below the trade price of the suspect trade to a specific amount above the trade price of the suspect trade, wherein the suspect trade is considered a non-suspect trade if the trade price of the at least a first non-suspect trade falls within the suspect acceptability price range; and
    a last known good price adjustment process for adjusting the last known good price of the specific stock being traded to be equal to the trade price of the last non-suspect trade.

14. The computer system of claim 13 wherein the at least a first non-suspect trade is one trade.

15. The computer system of claim 13 wherein the at least a first non-suspect trade is three consecutive trades.

16. The computer system of claim 13 wherein the specific amount above said trade price of the suspect trade and said specific amount below said trade price of the suspect trade are fixed dollar amounts.

17. The computer system of claim 13 wherein the specific amount above the trade price of the suspect trade and the specific amount below the trade price of the suspect trade are a percentage of the trade price of the suspect trade.

18. The computer system of claim 17 wherein said percentage of the trade price of the suspect trade is 5%.

19. The computer system of claim 1 wherein the trade monitoring process monitors a trade volume associated with each trade, the trade filtering process further comprising:
a validity filter process for examining the trade volume and the trade price of each the trade, and for discarding trades whose trade volume is negative, whose trade volume is zero, whose trade price is negative, and whose trade price is zero.

20. A method of preventing processing of suspect trades, the method executed in a computer system and the method comprising:
monitoring a trade price associated with each trade of a specific stock during a trading session;
comparing in the computer system the trade price of each trade of a specific stock to a known acceptable price for that specific stock, with the acceptable price being a range of prices that span from a specific amount below to a specific amount above the last known good price, to determine which trades are suspect trades, which have trade prices that fall outside the acceptable range of prices;
preventing processing of the suspect trades;
determining a last known good price for a specific stock being traded; and
adjusting the last known good price of the specific stock being traded to be equal to the trade price of the last non-suspect trade.

21. The method of claim 20 further comprising a suspect trade resolution process for determining if each said suspect trade is a bad trade.

22. The method of claim 21 wherein said suspect trade resolution process includes:
a suspect trade repository process for storing said trade price of said suspect trade;
a non-suspect price determination process for determining the trade price of at least a first non-suspect trade of the specific stock to occur after said suspect trade;
a suspect trade acceptability window process for determining a suspect acceptability price range, wherein said suspect acceptability price range spans from a specific amount below said trade price of said suspect trade to a specific amount above said trade price of said suspect trade, wherein said suspect trade is considered a non-suspect trade if the trade price of said at least a first non-suspect trade falls within said suspect acceptability price range; and
a last known good price adjustment process for adjusting said last known good price of said specific stock being traded to be equal to said trade price of the last non-suspect trade.

23. A computer-implemented method for preventing the processing of suspect trades, the method comprising:
monitoring by a computer a trade price associated with each trade of a specific stock during a trading session;
comparing by the computer the trade price of each trade of a specific stock to a known acceptable price for that specific stock to determine which trades are suspect trades; and
preventing the processing of the suspect trades.

24. The trade filtering method of claim 23 further comprising determining the value of the known acceptable price.

25. The trade filtering method of claim 24 wherein determining the value of the known acceptable price includes:
determining a last known good price for the specific stock being traded;
determining the known acceptable price, wherein the known acceptable price is an acceptable range of prices which span from a specific amount below the last known good price to a amount above the last known good price, with those trades which have trade prices that do not fall within the acceptable range of prices being considered suspect trades; and
adjusting by the computer the last known good price of the specific stock being traded to be equal to the trade price of the last non-suspect trade.

26. The trade filtering method of claim 25 further comprising adjusting the last known good price of the specific stock being traded to be equal to a reference value whenever the stock is being traded for the first time in the trading session.

27. The trade filtering method of claim 25 further comprising determining if each suspect trade is a bad trade.

28. The trade filtering method of claim 27 wherein determining if each suspect trade is a bad trade includes:
storing the trade price of the suspect trade;
determining the trade price of at least a first non-suspect trade of the specific stock to occur after the suspect trade;
determining a suspect acceptability price range, wherein the suspect acceptability price range spans from a specific amount below the trade price of the suspect trade to a specific amount above the trade price of the suspect trade, wherein the suspect trade is considered a non-suspect trade if the trade price of the at least a first non-suspect trade falls within the suspect acceptability price range; and
adjusting by the computer the last known good price of the specific stock being traded to be equal to the trade price of the last non-suspect trade.

29. The trade filtering method of claim 23 further comprising:
monitoring a trade volume associated with each trade;
examining the trade volume and trade price of each trade; and
discarding trades whose trade volume is negative, whose trade volume is zero, whose trade price is negative, and whose trade price is zero.

30. A computer program product residing on a computer readable medium having a plurality of instructions stored thereon which, when executed by the processor, cause that processor to:
monitor a trade price associated with each trade of a specific stock during a trading session;
compare the trade price of each trade of a specific stock to a known acceptable price for that specific stock to determine which trades are suspect trades; and
prevent the processing of the suspect trades.

31. The computer program product of claim 30 further comprising instructions to:
determine an acceptable range of prices that span from a specific amount below the last known good price to a specific amount above the last known good price, with trades that have trade prices that do not fall within the acceptable range of prices being considered suspect trades.

32. The computer program product of claim 30 further comprising instructions to:
adjust the last known good price of the specific stock being traded to be equal to the trade price of the last non-suspect trade.

33. The computer program product of claim 30 further comprising instructions to:
monitor a trade volume associated with each trade; and
examine the trade volume and the trade price of each the trade to discard those trades whose trade volume is negative, whose trade volume is zero, whose trade price is negative, and whose trade price is zero.

34. The computer program product of claim 30 further comprising instructions to:

determine if each suspect trade is a bad trade.

35. The computer program product of claim 30 wherein instructions to determine a bad trade, further comprises instructions to:

determine the trade price of a first non-suspect trade of the specific stock to occur after the suspect trade;

determine a suspect acceptability price range that spans from a specific amount below the trade price of the suspect trade to a specific amount above the trade price of the suspect trade, with the suspect trade being a non-suspect trade if the trade price of the first non-suspect trade falls within the suspect acceptability price range; and adjust the last known good price of the specific stock being traded to be equal to the trade price of the last non-suspect trade.

* * * * *

UNITED STATES PATENT AND TRADEMARK OFFICE
CERTIFICATE OF CORRECTION

PATENT NO.       : 7,660,759 B2  Page 1 of 1
APPLICATION NO. : 09/841661
DATED            : February 9, 2010
INVENTOR(S)      : Delta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3039 days.

Signed and Sealed this

Twenty-eighth Day of December, 2010

David J. Kappos
*Director of the United States Patent and Trademark Office*